US007089582B1

(12) United States Patent
Dutta

(10) Patent No.: US 7,089,582 B1
(45) Date of Patent: Aug. 8, 2006

(54) METHOD AND APPARATUS FOR IDENTIFYING UNIVERSAL RESOURCE LOCATOR REWRITING IN A DISTRIBUTED DATA PROCESSING SYSTEM

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,225

(22) Filed: Feb. 17, 2000

(51) Int. Cl.
*H04L 9/32* (2006.01)

(52) U.S. Cl. .............................. 726/3; 707/10; 709/224
(58) Field of Classification Search ............... 713/201, 713/154, 200, 153, 155; 709/207, 224–226, 709/227, 201; 707/501, 6, 9–10; 705/517; 726/3

See application file for complete search history.

(56) References Cited

U.S. PATENT DOCUMENTS

| | | | | |
|---|---|---|---|---|
| 5,835,718 | A | | 11/1998 | Blewett .................. 395/200.48 |
| 5,987,480 | A | * | 11/1999 | Donohue et al. ......... 715/501.1 |
| 5,987,611 | A | | 11/1999 | Freund ....................... 713/201 |
| 5,991,878 | A | | 11/1999 | McDonough et al. ....... 713/200 |
| 6,055,522 | A | * | 4/2000 | Krishna et al. ............. 715/517 |
| 6,161,137 | A | * | 12/2000 | Ogdon et al. ............... 709/224 |
| 6,286,046 | B1 | * | 9/2001 | Bryant ....................... 709/224 |

FOREIGN PATENT DOCUMENTS

JP 09244976 9/1997

OTHER PUBLICATIONS www.junkbusters.com Junkbusters Corporation. pp. 1-3. 1996.*
Traffic Reduction of Name Server Lookups Over Low-Bandwidth Connections; International Business Machines Technical Disclosure Bulletin; Dec. 1996; pp. 221-222.
Proactive Universal Resource Locators Lookup in Internet Web Browsers; International Business Machines Technical Disclosure Bulletin; Sep. 1997; pp. 113-114.
Real-Time Mechanism For Accounting and Network Access Control; International Business Machines Technical Disclosure Bulletin; Apr. 1994; pp. 337-340.
The Internet Junkbuster; http://internet.junkbuster.com.

* cited by examiner

*Primary Examiner*—Hosuk Song
*Assistant Examiner*—T. B. Truong
(74) *Attorney, Agent, or Firm*—Duke W. Yee; Marilyn Smith Dawkins; Theodore D. Fay, III

(57) ABSTRACT

A method and apparatus in a data processing system for detecting monitoring of access to content. Content from a source using an identifier is requested, and a set of identifiers used to reach the content is sent to a validation service. The validation service retrieves content using the set of identifiers. Identifiers within the retrieved content is compared with identifiers located within the set of identifiers. If a match between identifiers in the set of identifiers and those identifiers in the retrieved content is absent, a response is generated indicating that access to the content is being monitored. In response to receiving the response from the validation service, the receipt of content from the source is selectively prevented.

39 Claims, 5 Drawing Sheets

METHOD AND APPARATUS FOR IDENTIFYING UNIVERSAL RESOURCE LOCATOR REWRITING IN A DISTRIBUTED DATA PROCESSING SYSTEM

BACKGROUND OF THE INVENTION

1. Technical Field

The present invention relates generally to an improved data processing system and in particular to a method and apparatus for detecting the monitoring of user requests in a network. Still more particularly, the present invention provides a method and apparatus for identifying rewriting of universal resource locators in content requested by a user.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web, while others use the Web to extend their reach.

With this wide use of the Internet, businesses have become interested in the behavior of users on the Internet. Information on the behavior of users on the Internet is useful in targeting users for advertising and for businesses trying to identify who visits their Web sites. With respect to tracking user behavior, privacy has become an important issue for many users. The tracking of the behavior of a user is often considered a violation of the user's privacy. One common mechanism used to track browsing habits of a user employs the use of a cookie. A cookie is data created by a Web server that is stored on a user's computer. The cookie provides a way for the Web site to keep track of a user's patterns and preferences and, with the cooperation of the Web browser, to store them on the user's own hard disk. Browsers, however, allow the user an option to refuse cookies or to selectively monitor the acceptance of cookies.

Other mechanisms are present for tracking user behavior other than cookies. One example is the rewriting of URLs by a Web server. In such a case, different users visiting the same site will receive the same pages, but the pages will contain URLs that are dynamically generated for each particular user when that user accesses a particular page. For example, a home page for a Web site, such as www.news.com, may include a hyperlink to a sports site. This hyperlink may be dynamically generated in a manner that can be used to track the behavior of users. When a first user downloads the home page for the URL, www.news.com/index.html, on Jan. 10, 2000, at 3:35 p.m., the home page includes the following URL for the hyperlink to the sports site: www.news.com/sports/user#001month_01_10_00_time_3_35_pm.

When a second user downloads this home page at 3:36 p.m. on the same day, the following hyperlink to the sports site is generated for the home page: www.news.com/sports/user#002month_01_10_00_time_3_36_pm. For each user, all of the hyperlinks contain a user field, a date field, and a time field. With this type of hyperlink, it is easy for a Web server to send the same page on sports by interpreting the hyperlink selected by the user and at the same time to track the user. With this information, the time taken to read a Web page also may be identified. One solution for this type of tracking is to employ privacy trust labels generated by sites that review Web sites and certify that Web sites do not track user behavior without permission. Such a system, however, is expensive and prone to fraud. Also, user intervention is needed to determine whether to visit the site.

Therefore, it would be advantageous to have an improved method and apparatus for identifying monitoring or tracking of user behavior.

SUMMARY OF THE INVENTION

The present invention provides a method and apparatus in a data processing system for detecting monitoring of access to content. Content from a source using an identifier is requested, and a set of identifiers used to reach the content is sent to a validation service. The validation service retrieves content using the set of identifiers. Identifiers within the retrieved content is compared with identifiers located within the set of identifiers. If a match between identifiers in the set of identifiers and those identifiers in the retrieved content is absent, a response is generated indicating that access to the content is being monitored. In response to receiving the response from the validation service, the receipt of content from the source is selectively prevented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
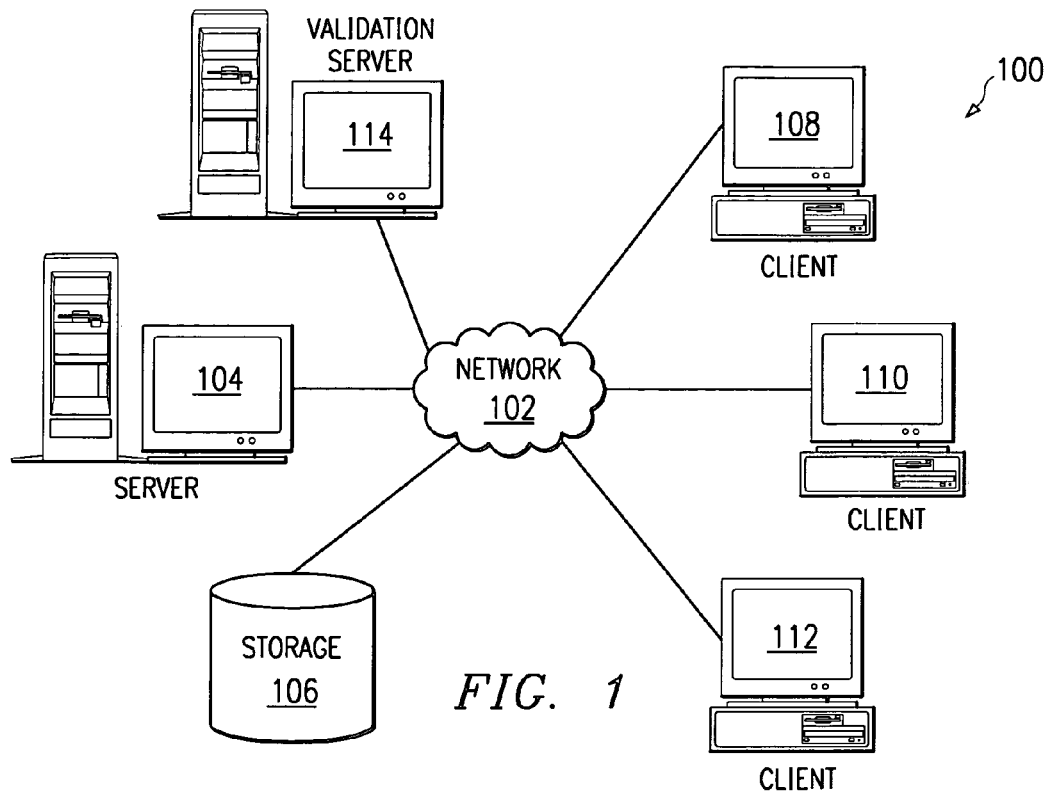
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In this example, a validation server 114 also is present within distributed data processing system 100. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. Of course, distributed data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
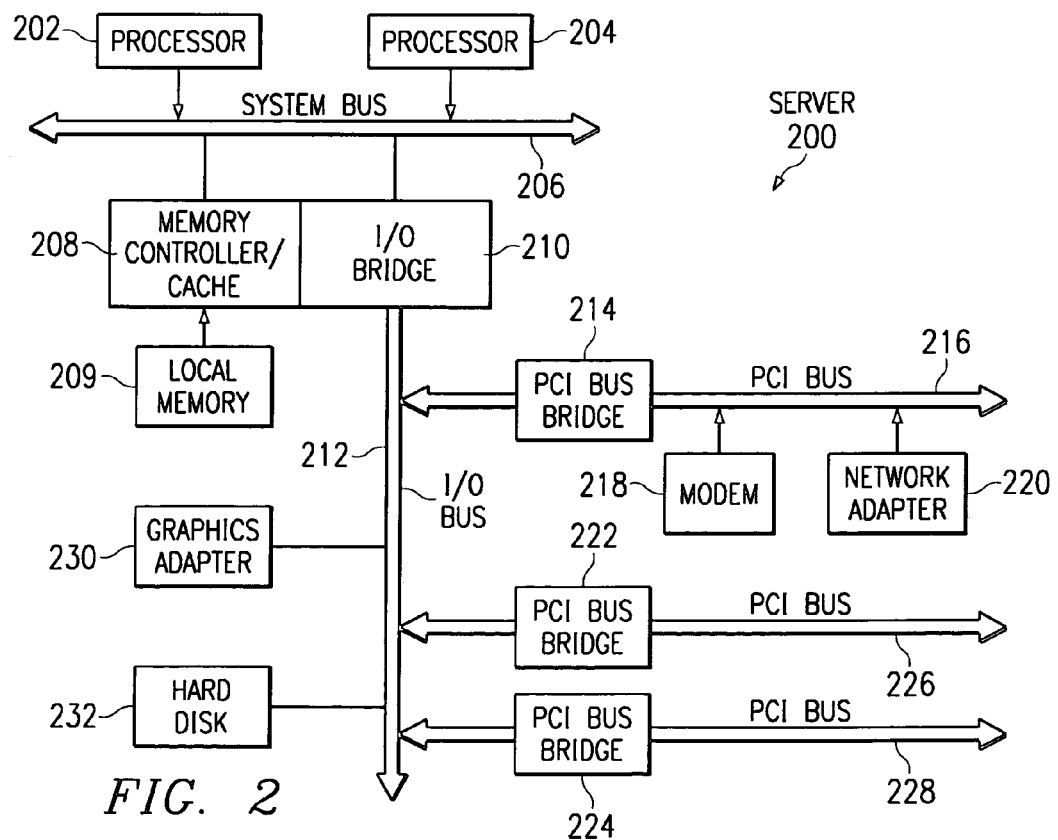
FIG. 2 is a block diagram of a data processing system that may be implemented as a server in accordance with a preferred embodiment of the present invention.

Referring to FIG. 2, a block diagram of a data processing system that may be implemented as a server, such as server 104 or validation server 114 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
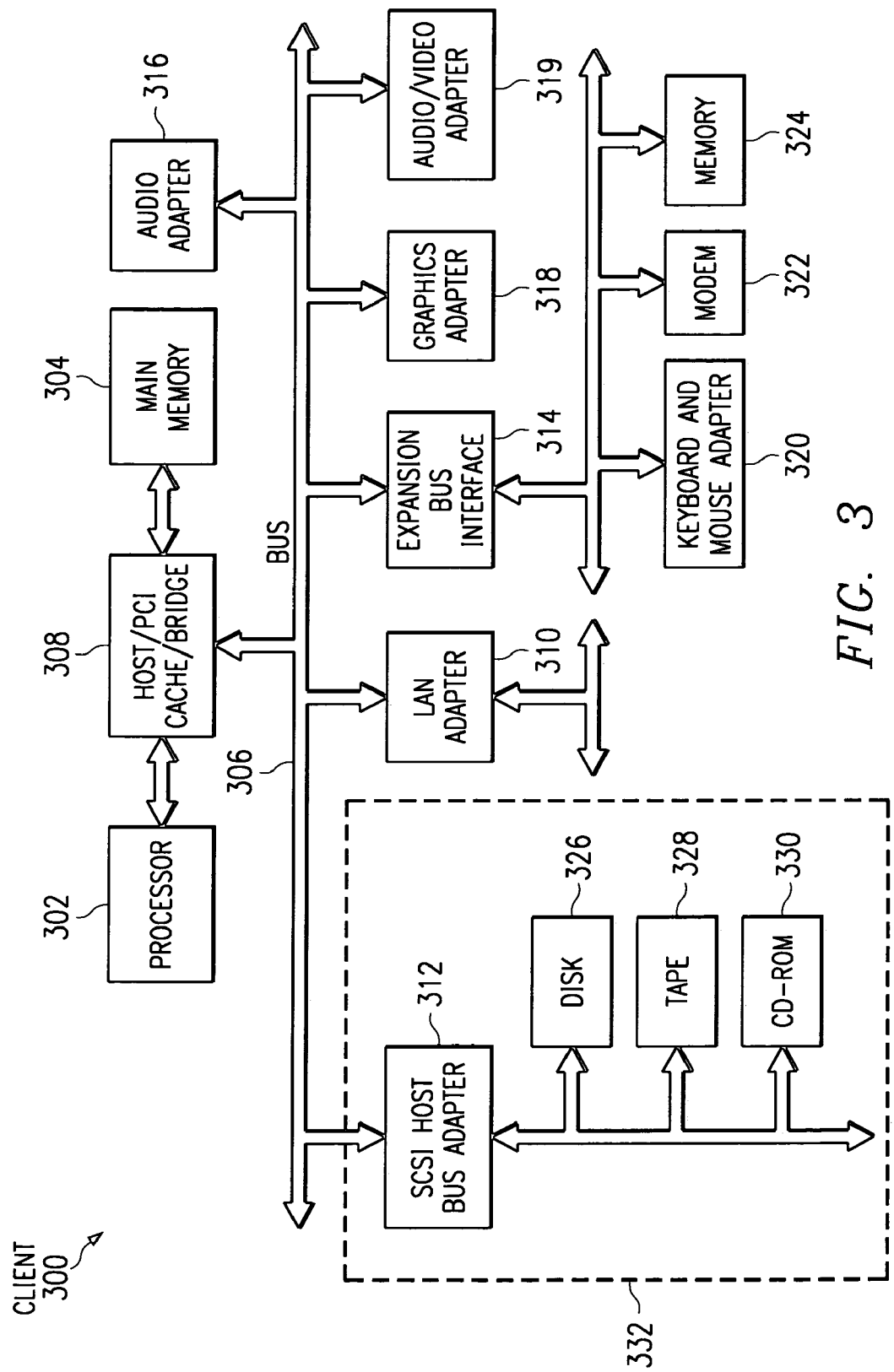
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Accelerated Graphics Port (AGP) and Industry Standard Architecture(ISA), may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for identifying monitoring of user behavior and taking corrective action in response to identifying unauthorized monitoring. When a concern with privacy on a Web site is present, a first request is sent by the user at a client for a Web page from the Web site. A second request is sent by the client to a validating server to see whether unauthorized monitoring is occurring. This second request includes a sequence of identifiers, such as, for example, a set of URLs, by which the user went to the Web page. The validation server will trace the path using the sequence of identifiers and determine whether the identifiers being returned from the Web site are different from those returned to the client. If the identifiers being returned are different, the validation server will send such an indication to the client. In response, the client may add the Web site to a list of Web sites to be banned or avoided.

Figure 4:
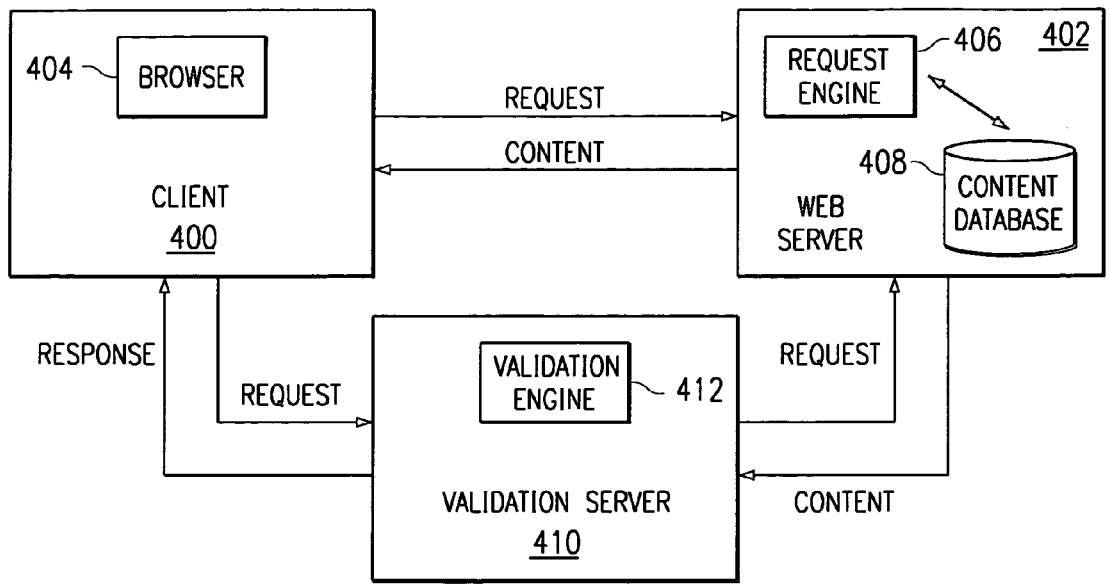
FIG. 4 is a block diagram of components used to identify and handle unauthorized monitoring of user access to content in accordance with a preferred embodiment of the present invention.

With reference now to FIG. 4, a block diagram of components used to identify and handle unauthorized monitoring of user access to content is depicted in accordance with a preferred embodiment of the present invention. Client 400 may send requests to Web server 402 through browser 404. In this example, client 400 may be a client, such as data processing system 300 in FIG. 3, and Web server 402 may be implemented using a Web server, such as data processing system 200 in FIG. 2. Browser 404 may be implemented using Web browsers, such as Microsoft Internet Explorer from Microsoft Corporation or Netscape Navigator from Netscape Communications Corporation.

Web server 402 receives and processes the request through request engine 406. Request engine 406 accesses content in content database 408 to generate or retrieve a Web page for return to client 400.

If the user at client 400 suspects unauthorized monitoring is occurring when retrieving a Web page from Web server 402, a request may be sent to validation server 410 to determine whether such a situation is occurring. The request is received by validation engine 412. In these examples, the request includes a set of URLs used to retrieve the Web page from Web server 402. In this example, the set of URLs are sent in a sequence by which browser 404 retrieved the Web page. Of course, other types of resource location pointers and record identifiers other than URLs may be used as well with the mechanism of the present invention.

In response to receiving the request from client 400, validation engine 412 sends requests to Web server 402 for Web pages using the set of URLs. URLs in the retrieved content are compared with those in the set of URLs received from client 400 to determine whether a match is present. More specifically, validation engine 412 starts with the first URL in the set and retrieves the Web page for the URL. The URLs in the Web page are compared with the next URL in the set to see if a match occurs. Then, the second URL in the set is used to retrieve a second Web page pointed to by the second URL. A comparison is made as to whether a URL in the second Web page matches the third URL in the set. This comparison goes on through the set of URLs to see if the URLs being sent to client 400 are different from those retrieved by validation engine 412 in validation server 410. Specifically, the comparison is to see whether rewriting or dynamic generation of identifiers specific for a particular user is occurring. If such a situation is present, validation server 410 will provide this indication in a response returned to client 400.

With such a response, client 400 may block content from Web server 402. More specifically, the content blocked would be with respect to a particular Web site on Web server 402 identified by a domain name. Web server 402 may host other Web sites that do not perform unauthorized monitoring of user access to content.

Figure 5:
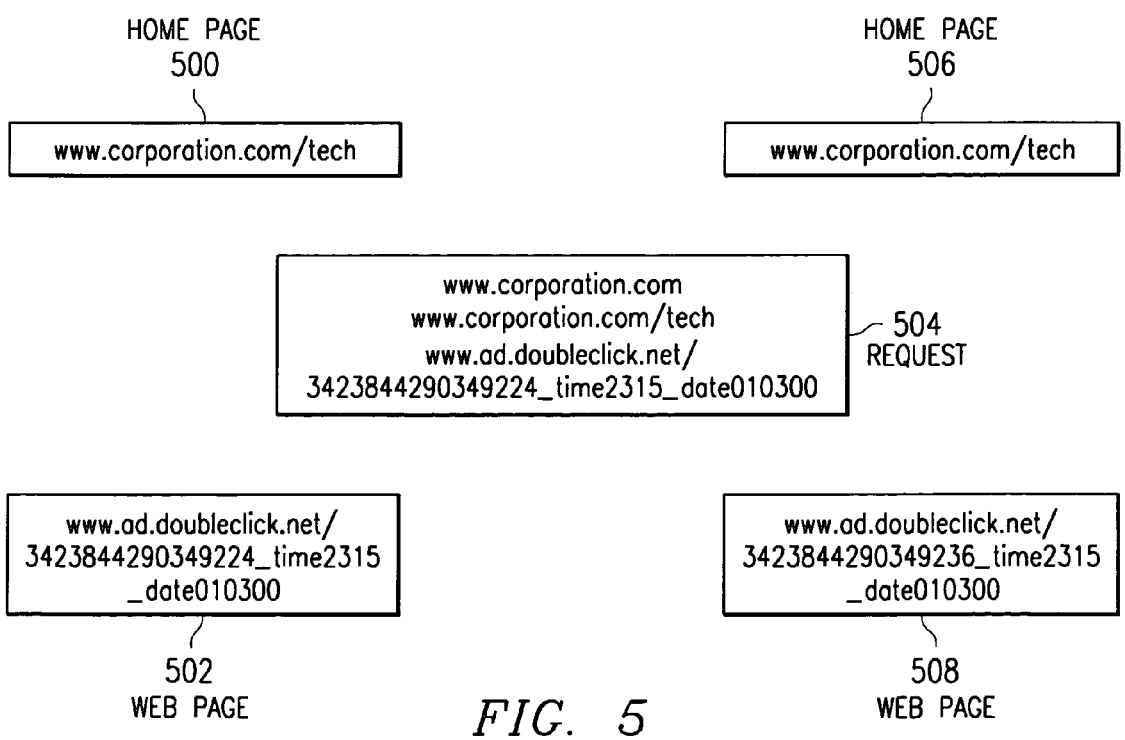
FIG. 5 is a diagram illustrating Web pages and URLs used in identifying unauthorized monitoring of user behavior in accordance with a preferred embodiment of the present invention.

Turning next to FIG. 5, a diagram illustrating Web pages and URLs used in identifying unauthorized monitoring of user behavior is depicted in accordance with a preferred embodiment of the present invention. This diagram illustrates Web pages received by a client, such as client 400 in FIG. 4, and Web pages received by a validation server, such as validation server 410 in FIG. 4.

In FIG. 4, a URL to a home page is entered in a browser by a user. In this example, the URL is www.corporation.com. This URL is used to retrieve home page 500 from a Web server. Home page 500 contains the following URL:

www.corporation.com/tech. The URL is then used to retrieve Web page 502, which contains the following URL: ad.doubleclick.net/3423844290349224_time2315_date010300.

In this example, this URL is selected by the user, and the browser requests the Web page associated with the URL from the Web server. In addition, a request 504 is sent to a validation server to see whether unauthorized monitoring of the user's activities has occurred. Request 504 contains URLs: (1) www.corporation.com, (2) www.corporation.com/tech, and (3) ad.doubleclick.net/3423844290349224_time2315_date010300. These URLs are in an order or sequence in which the user followed to request the Web page.

In response to receiving request 504, the validation server will request a home page from the Web site using www.corporation.com. In this example, home page 506 is returned to the validation server. The validation server will determine whether the second URL, www.corporation.com/tech, matches the URL returned in home page 506. In this example, the URL in home page 500 and the URL in home page 506 match. The validation server will then take the second URL from request 504 and request the Web page pointed to by the URL. In this example, Web page 508 is returned. When Web page 508 is received by the validation server, the URL in this page is compared to the third URL received in the request, ad.doubleclick.net/3423844290349224_time2315_date010300. In this example, a match is not present between the URL in Web page 508 and the URL in request 504. As a result, a response is generated indicating that unauthorized monitoring or tracking of the user's activities is occurring. This indication may be provided by placing the domain name of the Web site in the response to the client. In this case, the domain name is www.corporation.com.

As a result, the user may decide to place this Web site on a list of banned Web sites to prevent visiting or receiving content from the Web site. Presently available applications may be used to implement banning of Web sites. For example, the "Internet Junkbuster Proxy" is an application available from Junkbusters Corporation, http://www.junkbusters.com. This application blocks requests for URLs matching those in a file maintained by the application.

Figure 6:
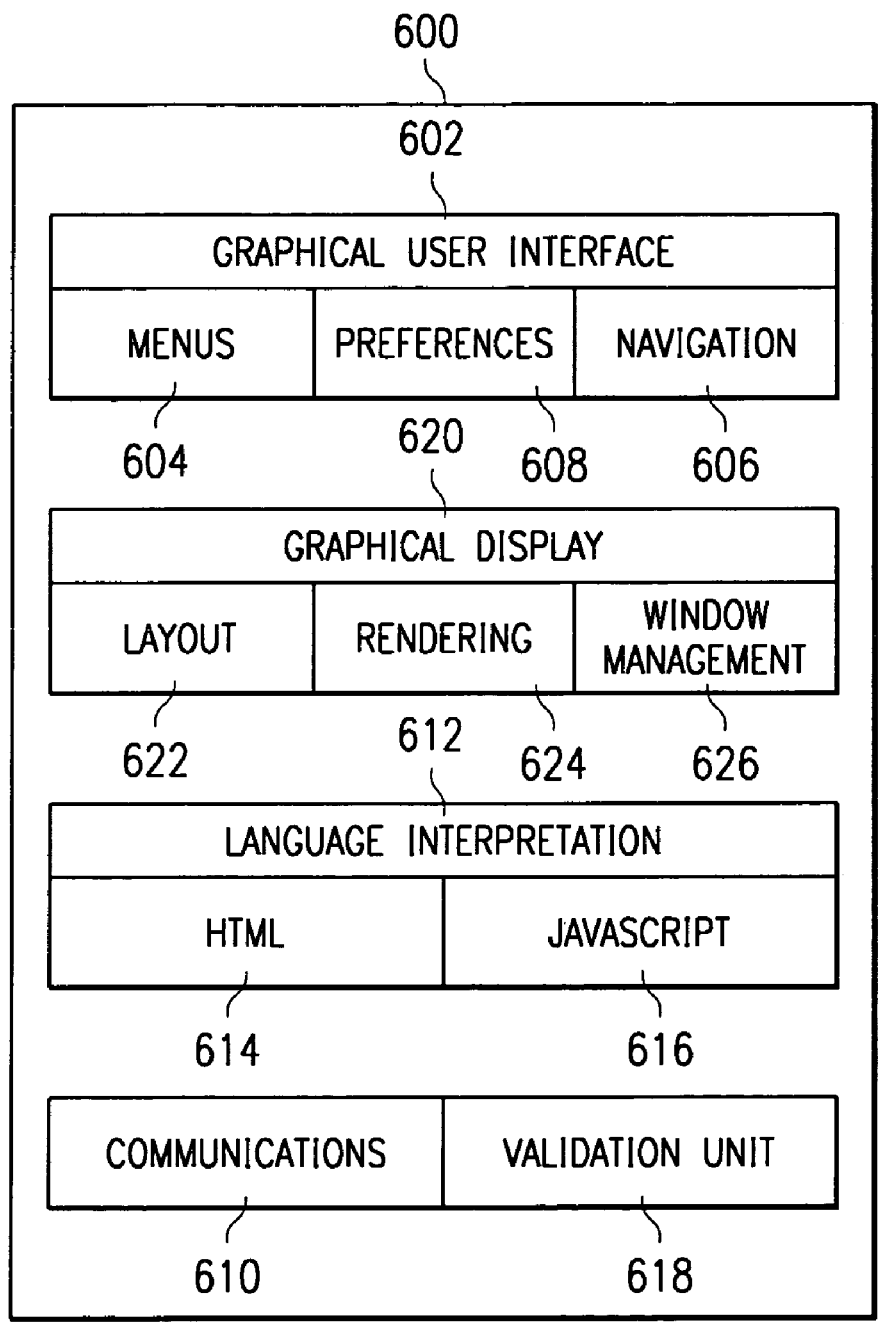
FIG. 6 is a block diagram of a browser in accordance with a preferred embodiment of the present invention in which the processes of the present invention may be implemented.

With reference next to FIG. 6, a block diagram of a browser is depicted in accordance with a preferred embodiment of the present invention in which the processes of the present invention may be implemented. In this example, browser 600 includes a graphical user interface (GUI) 602, which allows the user to interface or communicate with browser 600. This interface provides for selection of various functions through menus 604 and allows for navigation through navigation 606. For example, menu 604 may allow a user to perform various functions, such as saving a file, opening a new window, displaying a history, and entering a URL. Navigation 606 allows for a user to navigate various pages and to select web sites for viewing. For example, navigation 606 may allow a user to see a previous page or a subsequent page relative to the present page. Preferences such as those illustrated in FIG. 6 may be set through preferences 608.

Communications 610 is the mechanism with which browser 600 receives documents and other resources from a network such as the Internet. Further, communications 610 is used to send or upload documents and resources onto a network. In the depicted example, communications 610 uses HTTP. Other protocols may be used depending on the implementation. Documents that are received by browser 600 are processed by language interpretation 612, which includes an HTML unit 614 and a JavaScript unit 616. Language interpretation 612 will process a document for presentation on graphical display 620. In particular, HTML statements are processed by HTML unit 614 for presentation while JavaScript statements are processed by JavaScript unit 616.

In this example, the processes of the present invention may be implemented within validation unit 618. In particular, validation unit 618 may contain processes to obtain a set of URLs and generate a request to a validation server using the URLs. These URLs may be obtained from a history list or tracked by validation unit 618 as the user browses different Web sites. Additionally, validation unit 618 may be used to identify responses from a validation server and to initiate an alert to the user through GUI 602. Further, if a Web site is to be banned or avoided, validation unit 618 may place the domain name of the Web site in an appropriate data structure to allow another process to monitor for and prevent access to banned sites.

Graphical display 620 includes layout unit 622, rendering unit 624, and window management 626. These units are involved in presenting web pages to a user based on results from language interpretation 612.

Browser 600 is presented as an example of a browser program in which the present invention may be embodied. Browser 600 is not meant to imply architectural limitations to the present invention. Presently available browsers may include additional functions not shown or may omit functions shown in browser 600.

A browser may be any application that is used to search for and display content on a distributed data processing system. Browser 600 make be implemented using known browser applications, such Netscape Navigator or Microsoft Internet Explorer. Netscape Navigator is available from Netscape Communications Corporation while Microsoft Internet Explorer is available from Microsoft Corporation.

Figure 7:
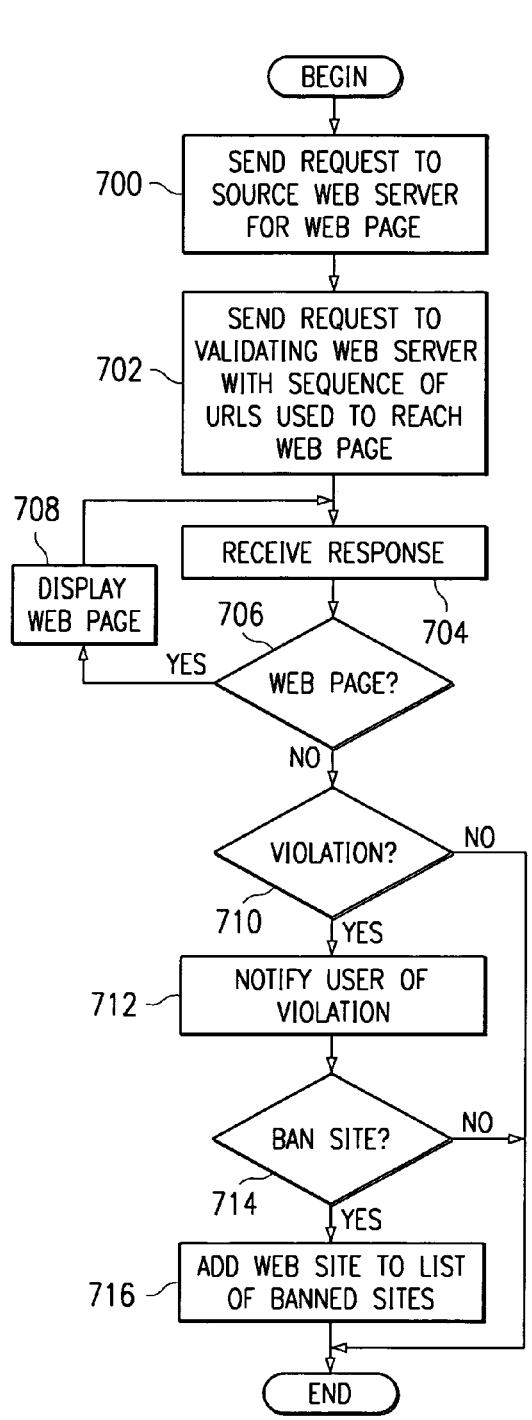
FIG. 7 is a flowchart of a process to request a determination of whether user activities are being monitored in accordance with a preferred embodiment of the present invention.

With reference now to FIG. 7, a flowchart of a process to request a determination of whether user activities are being monitored is depicted in accordance with a preferred embodiment of the present invention. The processes in FIG. 7 may be implemented in a browser, such as, for example, browser 600 in FIG. 6. Of course, these processes may be implemented elsewhere in a client at which a user is accessing content from a network. The process begins by sending a request to a source Web server for a Web page (step 700). A request is also sent to a validating Web server in which the request contains the sequence of URLs used to request the Web page (step 702). Steps 700 and 702 may occur simultaneously or in any order depending on the implementation. The request containing the URLs may be obtained from a history maintained by the browser or through another source tracking the URLs used by the user.

A response to the request is received (step 704). A determination is made as to whether the response is the requested Web page (step 706). If the response is the requested Web page, the Web page is displayed (step 708) with the process then returning to step 704. If the response is not a Web page, then a determination is made as to whether the response indicates a violation of privacy has occurred (step 710). This determination may be made by seeing whether a domain name has been returned from the validation server. If one or more domain names have been returned, then a violation has occurred in which monitoring of user activities has been detected.

If a violation has occurred, the user is notified of the violation (step 712). This may be a visual alert or a combination of visual and audio alerts. Additionally, the notification may also request that the user decide whether to ban the Web site. A determination is then made as to whether the Web site is to be banned (step 714). If the Web site is to be banned, the Web site is added to a list of banned Web sites (step 716) with the process terminating thereafter. If the Web site is not to be banned, the process just terminates. The process also terminates if, in step 710, a determination is made that no violation of privacy has occurred.

Figure 8:
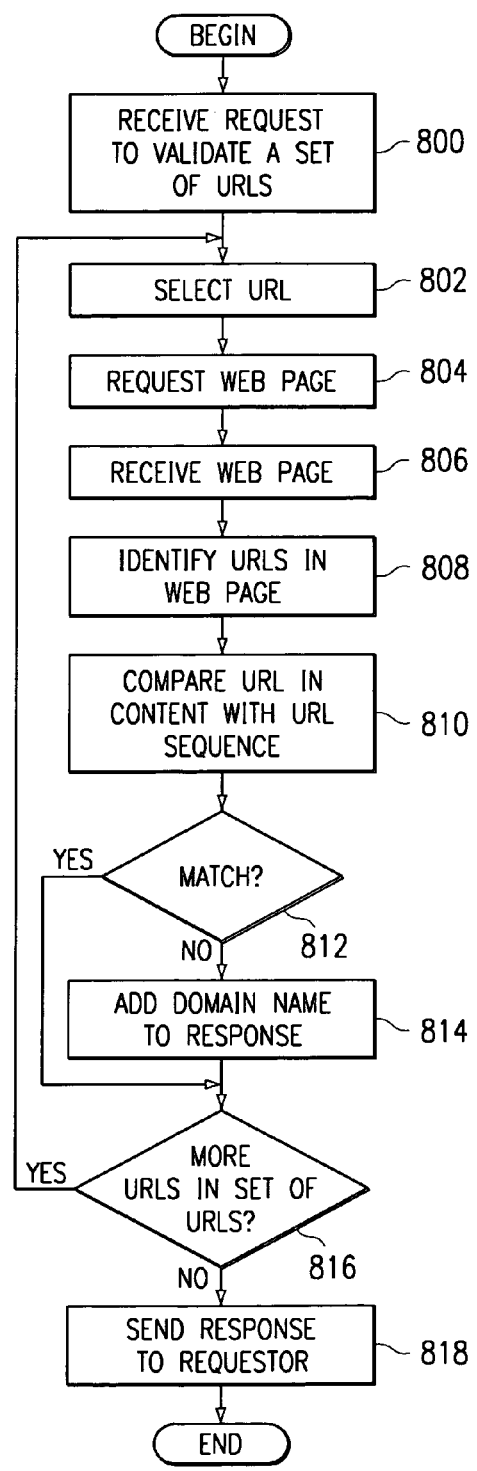
FIG. 8 is a flowchart of a process used to determine whether user activities are being monitored in accordance with a preferred embodiment of the present invention.

With reference now to FIG. 8, a flowchart of a process used to determine whether user activities are being monitored is depicted in accordance with a preferred embodiment of the present invention. This process is directed towards determining whether rewriting of URLs is occurring for a user. The process may be implemented in a validation server, such as validation server 410 in FIG. 4. Additionally, these processes also may be implemented within the same client as the Web browser, as well as on a different client or on a server.

The process begins by receiving a request to validate a set of URLs (step 800). The process then selects an unprocessed URL from a set of URLs (step 802). The set of URLs are in a sequence or order. A Web page is requested using the selected URL (step 804). The Web page is received (step 806), and one or more URLs in the Web page are identified (step 808). The identified URLs are compared with the URL selected for processing (step 810). A determination is made as to whether a match is present between the selected URL and the identified URLs (step 812). If a match is absent, the domain name of the Web site is added to the response (step 814). A determination is then made as to whether additional unprocessed URLs are present in the set of URLs (step 816).

If additional unprocessed URLs are present, the process returns to step 802. Otherwise, the response is sent to the requester (step 818) with the process terminating thereafter. Turning again to step 812, if a match is present, the process proceeds to step 816 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, CD-ROMs, DVD-ROMs, and transmission-type media such as digital and analog communications links, wired or wireless communications links using transmission forms such as, for example, radio frequency and light wave transmissions. The computer readable media may take the form coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted examples are directed towards identifying rewriting of URLs, the mechanism of the present invention may be applied to other types of identifiers used to obtain content. Further, the processes of the present invention may be applied to other types of content containing identifiers other than Web pages. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for detecting monitoring of access to content, the method comprising the data processing system implemented steps of:
   requesting the content from a source using a set of identifiers;
   receiving the content from the source to form received content, wherein at least one returned identifier is returned from the source in which the at least one returned identifier represents a location of the content;
   sending identifiers to a validation service, wherein the identifiers include the set of identifies used to request the received content and each returned identifier representing the location of the content at the source; and
   responsive to receiving a response from the validation service indicating the monitoring of user requests to access to the received content is occurring, selectively preventing receipt of additional content from the source.

2. The method of claim 1, wherein the source is a Web server.

3. The method of claim 1, wherein the content is a Web page.

4. The method of claim 1, wherein the validation service is located on a server.

5. The method of claim 1, wherein the step of selectively preventing receipt of content from the source comprises:
   presenting an indication of monitoring of user requests to access the received content is occurring by the source; and
   responsive to receiving user input indicating that receipt of additional content from the source should be prevented, preventing receipt of the additional content from the source.

6. The method of claim 5, wherein the step of preventing receipt of content from the source comprises:
   including an identification of the source in a service used to prevent receipt of content from identified sources.

7. The method of claim 1, wherein the identifier is a universal resource locator.

8. A method in a data processing system for detecting monitoring of access to content, the method comprising the data processing system implemented steps of:
   receiving a request from a requester to determine whether a source of the content is monitoring access by the requester, wherein the request includes a set of identifiers used to access selected content in which the set of identifiers includes a first number of identifiers sent by the requestor to the source to request the content and a second number of identifiers returned by the source in which the second number of identifiers represents a location of the content at the source returned to the requestor in response to the first number of identifiers;
   sending a new request to the source using an identifier from the first number of identifiers in the set of identifiers;
   receiving a first response from the source, wherein the response includes a return identifier;
   comparing the set of identifiers to the return identifier; and
   generating a second response indicating the monitoring of access by the requester for content by the source in response to an absence of a match between the return identifier and any identifier in the set of identifiers.

9. The method of claim 8 further comprising sending the second response to the requestor.

10. The method of claim 8, wherein the source is a Web server.

11. The method of claim 8, wherein the content is a Web page, wherein the first number of identifiers is a first universal resource locator sent by the requestor for the Web page, and wherein the second number of identifiers is a second universal resource locator that identifies a location of the Web page returned from the source in response to the requester sending the first universal resource locator to the source.

12. The method of claim 8, wherein the return identifier is a universal resource locator.

13. The method of claim 8, wherein the set of identifiers are in an order used to reach the selected content and wherein the sending, receiving, and comparing steps are performed for each of the identifiers within the set of identifiers.

14. The method of claim 8, wherein the step of generating the response comprises:
placing an identification of the source in the response.

15. The method of claim 8, wherein an identification of the source is a domain name for the source.

16. A browser program for use in a data processing system, the browser program comprising:
a communications interface, wherein the communications interface receives content from a network;
a graphical user interface used to display the content;
a language interpretation unit, wherein the language interpretation unit processes content received by the communications interface for display on the graphical user interface; and
a detection unit, wherein the detection unit requests the content from a source using a set of identifiers; receives the content from the source to form received content, wherein at least one returned identifier is returned from the source in which the at least one returned identifier represents a location of the contents at the source; sends identifiers to a validation service, wherein the identifiers includes the set of identifiers used to request the received content and each returned identifier representing the location of the received content; and selectively prevents receipt of additional content from the source in response to receiving a response from the validation service indicating the monitoring of user requests to access to received content is occurring.

17. The browser program of claim 16, wherein the language interpretation unit interprets hypertext markup language statements.

18. The browser program of claim 16, wherein the language interpretation unit interprets JavaScript.

19. A data processing system comprising:
a bus;
a communications interface connected to the bus, wherein the communications interface is configured for connection to a network;
a processing unit connected to the bus, wherein the processing unit executes instructions; and
a memory connected to the bus, wherein the memory includes instructions used to request the content from a source using a set of identifiers; receive the content from the source to form received content, wherein at least one returned identifier is returned from the source in which the at least one returned identifier represents a location of the received contents at the source; send identifiers to a validation service, wherein the identifiers includes the set of identifiers used to request the received content and each returned identifier representing the location of the received content; and selectively prevent receipt of additional content from the source in response to receiving a response from the validation service indicating monitoring of user requests to access to the received content is occurring.

20. The data processing system of claim 19, wherein the communications interface is one of a network adapter and a modem.

21. A data processing system comprising:
a bus;
a communications interface connected to the bus, wherein the communications interface is configured for connection to a network;
a processing unit connected to the bus, wherein the processing unit executes instructions; and
a memory connected to the bus, wherein the memory includes instructions used to receive a request from a requestor to determine whether a source of the content is monitoring access by the requestor in which the request includes a set of identifiers used to access selected content in which the set of identifiers includes a first number of identifiers sent by the requestor to the source to request the content and a second number of identifiers returned by the source in which the second number of identifiers represents a location of the content at the source returned to the requestor in response to the first number of identifiers; send a new request to the source using an identifier from the first number of identifiers in the set of identifiers, receive a first response from the source in which the response includes a return identifier, compare the set of identifiers to the return identifier, and generate a second response indicating the monitoring of access by the requestor for content by the source in response to an absence of a match between the return identifier and any identifier in the set of identifiers.

22. A data processing system for detecting monitoring of access to content, the data processing system comprising:
requesting means for requesting the content from a source using a set of identifiers;
receiving means for receiving the content from the source to form received content, wherein at least one returned identifier is returned from the source in which the at least one returned identifier represents a location of the content at the source;
sending means for sending identifiers to a validation service, wherein the identifiers includes the set of identifiers used to request the received content and each returned identifier representing the location of the received content; and
preventing means responsive to receiving a response from the validation service indicating the monitoring of user requests to access to the received content is occurring, for selectively preventing receipt of additional content from the source.

23. The data processing system of claim 22, wherein the source is a Web server.

24. The data processing system of claim 22, wherein the content is a Web page.

25. The data processing system of claim 22, wherein the validation service is located on a server.

26. The data processing system of claim 22, wherein the preventing means comprises:

presenting means for presenting an indication of monitoring of user requests to access the content is occurring by the source; and means, responsive to receiving user input indicating that receipt of the additional content from the source should be prevented, for preventing receipt of additional content from the source.

27. The data processing system of claim 26, wherein the preventing means comprises:

including means for including an identification of the source in a service used to prevent receipt of content from identified sources.

28. The data processing system of claim 22, wherein the identifier is a universal resource locator.

29. A data processing system for detecting monitoring of access to content, the data processing system comprising:

first receiving means for receiving a request from a requestor to determine whether a source of the content is monitoring access by the requestor, wherein the request includes a set of identifiers used to access selected content in which the set of identifiers includes a first number of identifiers sent by the requester to the source to request the content and a second number of identifiers returned by the source in which the second number of identifiers represents a location of the content at the source returned to the requester in response to the first number of identifiers;

sending means for sending a new request to the source using an identifier from the first number of identifiers in the set of identifiers;

second receiving means for receiving a first response from the source, wherein the response includes a return identifier;

comparing means for comparing the set of identifiers to the return identifier; and generating means for generating a second response indicating the monitoring of access by the requestor for content by the source in response to an absence of a match between the return identifier and any identifier in the set of identifiers.

30. The data processing system of claim 29 further comprising sending the response to the requestor.

31. The data processing system of claim 29, wherein the source is a Web server.

32. The data processing system of claim 29, wherein the content is a Web page, wherein the first number of identifiers is a first universal resource locator sent by the requestor for the Web page, and wherein the second number of identifiers is a second universal resource locator that identifies a location of the Web page returned from the source in response to the requestor sending the first universal resource locator to the source.

33. The data processing system of claim 29, wherein the identifier is a universal resource locator.

34. The data processing system of claim 29, wherein the set of identifiers are in an order used to reach the selected content and wherein the sending, receiving, and comparing steps are performed for each of the identifiers within the set of identifiers.

35. The data processing system of claim 29, wherein the generating means comprises:

placing means for placing an identification of the source in the response.

36. The data processing system of claim 29, wherein an identification of the source is a domain name for the source.

37. A computer program product in a computer readable medium for detecting monitoring of access to content, the computer program product comprising:

first instructions for requesting the content from a source using a set of identifiers;

second instructions for receiving the content from the source to form received content, wherein at least one returned identifier is returned from the source in which the at least one returned identifier represents a location of the content at the source;

third instructions for sending identifiers used to reach the received content to a validation service, wherein the identifiers include each identifier used to request the received content and each returned identifier representing the location of the received content; and fourth instructions, responsive to a response from the validation service indicating the monitoring of user requests to access to the received content is occurring, for selectively preventing receipt of additional content from the source.

38. A computer program product in a computer readable medium for detecting monitoring of access to content, the computer program product comprising:

first instructions for receiving a request from a requester to determine whether a source of the content is monitoring access by the requestor, wherein the request includes a set of identifiers used to access selected content in which the set of identifiers includes a first number of identifiers sent by the requestor to the source to request the content and a second number of identifiers returned by the source in which the second number of identifiers represents a location of the content at the source returned to the requester in response to the first number of identifiers;

second instructions for sending a new request to the source using an identifier from the first number of identifiers in the set of identifiers;

third instructions for receiving a first response from the source, wherein the response includes a return identifier;

fourth instructions for comparing the set of identifiers to the return identifier; and fifth instructions for generating a second response indicating the monitoring of access by the requester for content by the source in response to an absence of a match between the ret identifier and any identifier in the set of identifiers.

39. The method of claim 8, wherein the content is a plurality of Web pages, wherein the first number of identifiers contain first universal resource locators sent by the requestor for the plurality of Web pages, and wherein the second number of identifiers contain second universal resource locators that identify the plurality of Web pages returned from the source in response to the requestor sending the first universal resource locators to the source.

* * * * *